United States Patent
Migukin et al.

(10) Patent No.: US 11,244,426 B2
(45) Date of Patent: Feb. 8, 2022

(54) METHOD FOR IMAGE SUPER RESOLUTION IMITATING OPTICAL ZOOM IMPLEMENTED ON A RESOURCE-CONSTRAINED MOBILE DEVICE, AND A MOBILE DEVICE IMPLEMENTING THE SAME

(71) Applicant: Samsung Electronics Co., Ltd., Suwon-si (KR)

(72) Inventors: Artem Sergeevich Migukin, Moscow (RU); Anna Andreevna Varfolomeeva, Moscow (RU); Alexey Stanislavovich Chernyavskiy, Moscow (RU); Vitaly Vladimirovich Chernov, Moscow (RU)

(73) Assignee: Samsung Electronics Co., Ltd., Suwon-si (KR)

(*) Notice: Subject to any disclaimer, the term of this patent is extended or adjusted under 35 U.S.C. 154(b) by 17 days.

(21) Appl. No.: 16/728,402

(22) Filed: Dec. 27, 2019

(65) Prior Publication Data

US 2020/0211159 A1 Jul. 2, 2020

(30) Foreign Application Priority Data

Dec. 28, 2018 (RU) .............................. 2018147313

(51) Int. Cl.
*G06T 3/40* (2006.01)
*G06T 3/00* (2006.01)
(Continued)

(52) U.S. Cl.
CPC .......... *G06T 3/4053* (2013.01); *G06T 3/0012* (2013.01); *G06T 3/4007* (2013.01);
(Continued)

(58) Field of Classification Search
CPC ......... G06T 3/4053; G06T 2207/20081; G06T 2207/20084; G06T 3/40; G06T 3/4007;
(Continued)

(56) References Cited

U.S. PATENT DOCUMENTS 8,406,564 B2 3/2013 Sun et al.
8,620,073 B2 12/2013 Tuzel et al.
(Continued)

FOREIGN PATENT DOCUMENTS

RU 2016135261 A 3/2018
RU 2652722 C1 4/2018

OTHER PUBLICATIONS

Kim, Jiwon, Jung Kwon Lee, and Kyoung Mu Lee. "Accurate Image Super-Resolution Using Very Deep Convolutional Networks." 2016 IEEE Conference on Computer Vision and Pattern Recognition (CVPR). IEEE, 2016. (Year: 2016).*
(Continued)

*Primary Examiner* — Shefali D Goradia (57) ABSTRACT

A method for super resolution of an image imitating optical zoom implemented on a resource-constrained mobile device is includes inputting a first-resolution image. The method also includes assigning a super resolution factor from a predefined set of super resolution factors that indicate increasing the first resolution to obtain a second-resolution image. The super resolution factor indicates a trained intelligent system imitating the operation of the corresponding optical system among a plurality of intelligent systems trained for each super resolution factor of the predefined set of super resolution factors. The method further includes transforming the first-resolution image into the second-resolution image using said trained intelligent system.

16 Claims, 7 Drawing Sheets

(51) Int. Cl.
  *G06T 5/00* (2006.01)
  *G06T 5/40* (2006.01)
(52) U.S. Cl.
  CPC ............ *G06T 3/4046* (2013.01); *G06T 5/001* (2013.01); *G06T 5/40* (2013.01); *G06T 2207/20081* (2013.01); *G06T 2207/20084* (2013.01)
(58) Field of Classification Search
  CPC ......... G06T 3/403; G06T 3/4046–4092; G06T 3/0012; G06T 5/001; G06T 5/40; G06N 3/02–088; G06K 9/00
  USPC .................................. 382/156–158, 298–300
  See application file for complete search history.

(56) References Cited

U.S. PATENT DOCUMENTS

| | | | |
|---|---|---|---|
| 8,989,519 | B2 | 3/2015 | Irani et al. |
| 9,100,631 | B2 | 8/2015 | Broberg et al. |
| 9,432,616 | B1 | 8/2016 | Hurd et al. |
| 9,547,887 | B2 | 1/2017 | Liang et al. |
| 9,641,644 | B2 | 5/2017 | Levanon et al. |
| 9,652,830 | B2 | 5/2017 | Turkan et al. |
| 9,692,939 | B2 | 6/2017 | Irani et al. |
| 9,836,820 | B2 | 12/2017 | Tuzel et al. |
| 10,467,729 | B1* | 11/2019 | Perera ................... G06T 3/4053 |
| 2013/0177242 | A1 | 7/2013 | Adams, Jr. et al. |
| 2015/0269708 | A1* | 9/2015 | Porikli .................... G06T 5/003 382/160 |
| 2017/0053378 | A1 | 2/2017 | Chen |
| 2017/0186140 | A1 | 6/2017 | Eguchi |
| 2017/0206633 | A1 | 7/2017 | Gandolph et al. |
| 2017/0237910 | A1 | 8/2017 | Salin et al. |
| 2017/0256033 | A1 | 9/2017 | Tuzel et al. |
| 2017/0287109 | A1 | 10/2017 | Tasfi |
| 2017/0347060 | A1 | 11/2017 | Wang et al. |
| 2018/0005417 | A1 | 1/2018 | Schieke |
| 2018/0007362 | A1 | 1/2018 | Krishnan |
| 2018/0039855 | A1 | 2/2018 | Kecskemeti et al. |
| 2018/0063523 | A1 | 3/2018 | Marpe et al. |
| 2018/0075581 | A1 | 3/2018 | Shi et al. |
| 2018/0077419 | A1 | 3/2018 | Minoo et al. |
| 2018/0122048 | A1 | 5/2018 | Wang et al. |
| 2018/0137603 | A1 | 5/2018 | Hsiao et al. |
| 2018/0139458 | A1 | 5/2018 | Wang et al. |
| 2018/0293706 | A1* | 10/2018 | Viswanathan ......... G06T 3/4053 |

OTHER PUBLICATIONS

Zeng, Kun, et al. "Coupled deep autoencoder for single image super-resolution." IEEE transactions on cybernetics 47.1 (2015): 27-37. (Year: 2015).*

Dong, Chao, et al. "Learning a deep convolutional network for image super-resolution." European conference on computer vision. Springer, Cham, 2014. (Year: 2014).*

Dong, Chao, Chen Change Loy, and Xiaoou Tang. "Accelerating the super-resolution convolutional neural network." European conference on computer vision. Springer, Cham, 2016. (Year: 2016).*

Ha, Viet Khanh, et al. "Deep learning based single image super-resolution: A survey." International Conference on Brain Inspired Cognitive Systems. Springer, Cham, 2018. (Year: 2018).*

Ignatov, Andrey, et al. "AI Benchmark: Running Deep Neural Networks on Android Smartphones." arXiv preprint arXiv: 1810.01109v2 (2018). (Year: 2018).*

Qu, Chengchao, et al. "Capturing ground truth super-resolution data." 2016 IEEE International Conference on Image Processing (ICIP). IEEE, 2016. (Year: 2016).*

Toutounchi, Farzad, and Ebroul Izquierdo. "Enhancing Digital Zoom in Mobile Phone Cameras by Low Complexity Super-Resolution." 2018 IEEE International Conference on Multimedia & Expo Workshops (ICMEW). IEEE, 2018. (Year: 2018).*

Federal Service for Intellectual Property (ROSPATENT), "Decision to Grant," Application No. RU 2018147313, dated Jun. 26, 2019, 18 pages.

Federal Service for Intellectual Property (ROSPATENT), "Search Report," Application No. RU 2018147313, dated Apr. 25, 2019, 4 pages.

Dong, Chao, et al., "Image Super-Resolution Using Deep Convolutional Networks," arXiv:1501.00092v3 [cs.CV], Jul. 31, 2015, 14 pages.

Dong, Chao, et al., "Accelerating the Super-Resolution Convolutional Neural Network," IEEE, Proceedings of Computer Vision—ECCV 201, 14th European Conference, Amsterdam, The Netherlands, Oct. 11-14, 2016, 5 pages.

Shi, Wenzhe, et al., "Real-Time Single Image and Video Super-Resolution Using an Efficient Sub-Pixel Convolutional Neural Network," IEEE, 2016 IEEE Conference on Computer Vision and Pattern Recognition (CVPR), Jun. 27-30, 2016, 10 pages.

Shocher, Assaf, et al., ""Zero-Shot" Super-Resolution using Deep Internal Learning," IEEE, 2018 IEEE/CVF Conference on Computer Vision and Pattern Recognition, Jun. 18-23, 2018, 9 pages.

* cited by examiner

METHOD FOR IMAGE SUPER RESOLUTION IMITATING OPTICAL ZOOM IMPLEMENTED ON A RESOURCE-CONSTRAINED MOBILE DEVICE, AND A MOBILE DEVICE IMPLEMENTING THE SAME

CROSS-REFERENCE TO RELATED APPLICATION

This application is based on and claims priority under 35 U.S.C. 119 to Russian Patent Application No. 2018147313 filed on Dec. 28, 2018, in the Russian Intellectual Property Office, the disclosure of which is herein incorporated by reference in its entirety.

BACKGROUND

1. Field

The present invention relates to image processing using intelligent systems, in particular, to a method for image super resolution imitating optical zoom implemented on a resource-constrained mobile device and to a mobile device implementing the same.

2. Description of Related Art

Currently available processors of mobile devices enable widespread use of artificial intelligence (AI) for solving a large class of diverse tasks. One of these tasks is super resolution—generation of higher-resolution images based on original lower-resolution images. There are known prior art technical solutions that provide the super resolution, but have some drawbacks.

DESCRIPTION OF RELATED DOCUMENTS

Patent Documents

U.S. Pat. No. 9,836,820 B2, published on Dec. 5, 2017 and entitled "Image Upsampling Using Global and Local Constraints" discloses a method for image upsampling using a non-linear fully connected neural network to produce global details of an upsampled image and interpolation of the image to produce a smooth upsampled image. The drawbacks of this solution are slow timing performance and the required big amount of memory for convolutional neural network (CNN) parameters.

Patent application US 2017/0287109 A1, published on Oct. 5, 2017 and entitled "Image Scaling Using a Convolutional Neural Network" discloses a method for image scaling for online content systems using CNN. The drawbacks of this solution are also slow timing performance and the required big amount of memory for convolutional neural network (CNN) parameters.

Patent application US 2018/0075581 A1, published on Mar. 15, 2018 and entitled "Super Resolution Using a Generative Adversarial Network" discloses a method for super resolution using a generative adversarial network (GAN). The drawbacks of this solution are also slow timing performance and no information on high/low resolution images pair for training.

Patent application US 2018/0122048 A1, published on Mar. 5, 2018 and entitled "Generative Methods of Super Resolution" discloses generative methods of super resolution. The drawbacks of this solution are also slow timing performance and no information on high/low resolution images pair for training.

Non-Patent Scientific Publications

A number of non-patent scientific publications on super resolution are also known in the art. A publication of 2014 by C. Dong, C. C. Loy, K. He, X. Tang, entitled "Image Super-Resolution Using Deep Convolutional Networks" discloses a deep learning method for single image super-resolution. This method directly learns an end-to-end mapping between the low/high-resolution images. The mapping is represented by a deep CNN, that takes the first-resolution image as the input and outputs the second-resolution image. The drawbacks of this solution are the poor quality for real images and the slow computation of the final result.

Another publication of 2016 by C. Dong, C. C. Loy, X. Tang, entitled "Accelerating the Super-Resolution Convolutional Neural Network" discloses a compact hourglass-shape CNN structure for fast and high-quality super-resolution. The authors of this solution propose to re-design the CNN structure in three aspects: 1) to introduce a deconvolution layer at the end of the network, for mapping to be learned directly from the original low-resolution input image to the high-resolution output one, 2) to reformulate the mapping layer by shrinking the input feature dimension before mapping and expanding back afterwards and 3) to adopt smaller filter sizes but more mapping layers. The drawback of this solution is poor quality for al images that can be captured by mobile devices.

In another publication of 2016 by W. Shi, J. Caballero, F. Huszar et al, entitled "Real-Time Single Image and Video Super-Resolution Using an Efficient Sub-Pixel Convolutional Neural Network" a CNN architecture is proposed, where the feature maps are extracted in the low-resolution space of a processed input image. The proposed CNN architecture is capable of processing for super-resolution of 1080p videos on a single K2 GPU. The drawbacks of this solution are poor quality for real images that can be captured by mobile devices, as well as slow computation when implementing the CNN architecture.

In another publication of 2018 by A. Shocher, N. Cohen, M. Irani, entitled "'Zero-Shot' Super-Resolution using Deep Internal Learning", 'Zero-Shot' (unattended) super resolution exploits the power of Deep Learning, but does not rely on prior training. This approach extracts the internal recurrence of information inside a single image, and, for each processed image, trains a small image-specific CNN by using internal recurrence of information solely extracted from the processed image for training. As a result, such CNN can adapt itself to different settings per image. The drawback of this solution is slow computation when implementing the solution.

Various other implementations are known in the art, but, as far as it can be reasonably established from their available documentation, these implementations cannot adequately solve all the problems resolved by the invention described in this application.

SUMMARY

Embodiments of the present disclosure solve the above problems of image super resolution due to the unique procedure for preparing CNN training data sets, considering the optical zoom details. According to embodiments of the present disclosure, firstly, a training dataset is acquired, inter alia, by a camera with an in/out optical zoom system (for example, by a lens or a system of one or more lenses with an optical zoom in/out function). Secondly, context-sensitive features of the keypoints (for example, specific differences in brightness against a uniform background, prominent texture angles) shown in the image are detected using the human visual system (HVS) model. Thirdly, patch-based histogram matching is performed for distortion correction. In addition, embodiments of the present disclosure solves the above problems through the use of AI-based super resolution. In other words, an AI-based approach with many kernels/trained CNNs for different zoom factors is applied, and CNN size is optimized as trade-off between RAM amount for the mobile device and acceptable processing quality. The result is high quality of output images, fast timing performance, small size of the trained CNN model for more effective consumption of memory and energy (battery consumption of the mobile device), and quick transfer of the trained CNN to different devices and its use on such resource-constrained devices for high-quality and fast processing of different image types.

According to a first embodiment of the present disclosure, there is provided a method for image super resolution imitating optical zoom implemented on a resource-constrained mobile device, the method comprising: inputting a first-resolution image; assigning a super resolution factor from a predefined set of super resolution factors that indicate increasing the first resolution to obtain a second-resolution image, wherein the super resolution factor indicates a trained intelligent system imitating the operation of the corresponding optical system among a plurality of intelligent systems trained for each super resolution factor of the predefined set of super resolution factors; and transforming the first-resolution image into the second-resolution image using said trained intelligent system.

According to a second embodiment of the present disclosure, there is provided a mobile device comprising: a processor; a camera configured to capture a first-resolution image; a memory storing numerical parameters of a plurality of trained intelligent systems and instructions that, when executed by the processor, cause the processor to implement a method for image super resolution imitating optical zoom.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Other advantages of the present invention will become apparent to those ordinary skill in the art upon review of the following detailed description of various embodiments thereof, as well as the drawings in which:

FIGS. 5A-5B illustrate an example of operation of the super resolution method, where FIG. 5A shows a first-resolution image.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Preferred embodiments of the present invention will now be described in more detail with reference to the drawings, in which identical elements in different figures, where possible, are identified by the same reference numerals. These embodiments serve to explain the present invention, rather than to limit it. After reading this detailed description and drawings, various modifications and variations will be apparent to those skilled in the art.

Image super resolution usually means image HR upscaling (in pixels) with higher resolution, zooming and higher visual perception quality. This is a fundamental difference from simple scaling of an image, in which image upsampling inevitably leads to deterioration in image resolution and its zooming. Image zooming refers to the number of pixels per unit area of an image (ppi, pixels per inch) or the number of dots per unit area of an image (dpi, dots per inch).

Figure 1:
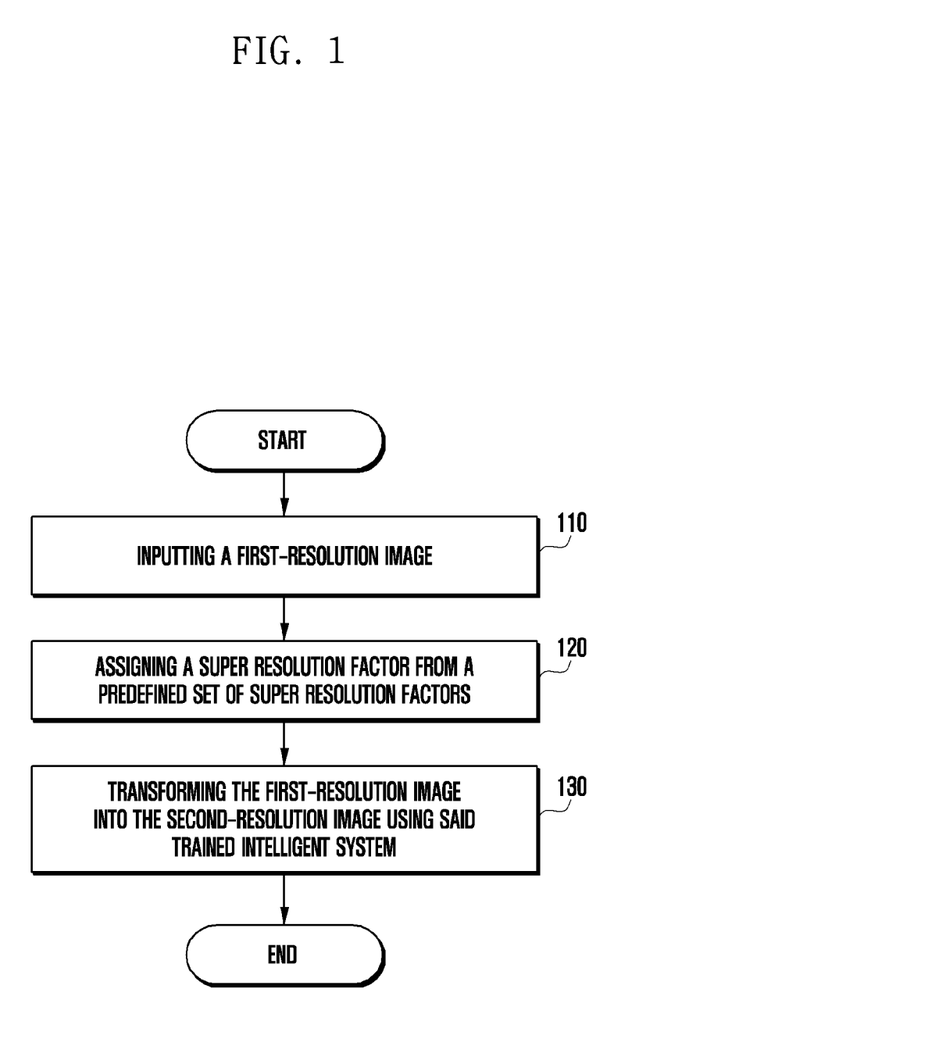
FIG. 1 illustrates a method for image super resolution imitating optical zoom implemented on a resource-constrained mobile device according to embodiments of this disclosure.

FIG. 1 illustrates a flowchart of a method for image super resolution imitating optical zoom implemented on a resource-constrained mobile device according to embodiments of this disclosure.

In step 110, a first-resolution image can be input in various ways, for example, by capturing the first-resolution image with a camera of the mobile device, loading the first-resolution image from a memory of the mobile device or an external data source, selecting an arbitrary image area as a first-resolution image, or any other way. The first-resolution image may be, but is not limited to, for example, a still image, a video data frame, or a sequence of video data frames. In addition, the first resolution may be lower than the second resolution.

Then, according to the method, in step 120, the super resolution factor can be assigned from a predefined set of super resolution factors. The super resolution factor indicates higher first resolution to obtain a second-resolution image. In addition, the super resolution factor indicates a trained intelligent system imitating the operation of the corresponding optical system among a plurality of intelligent systems trained for each super resolution factor of the predefined set of super resolution factors, which should be used when transforming the first-resolution image to the second-resolution image. According to an embodiment of the present disclosure, a trained convolutional neural network (CNN) is used as a trained intelligent system. However, instead of CNN, the present disclosure can use any other intelligent system, such as, for example, an autoencoder consisting of a coupled encoder and decoder, configured to generalize and correlate input data so that the decoder transforms the first-resolution image to the second-resolution image, or non-linear regression capable of approximating a function of transforming the first-resolution image into the second-resolution image as a non-linear combination of the model parameters.

Figure 6:
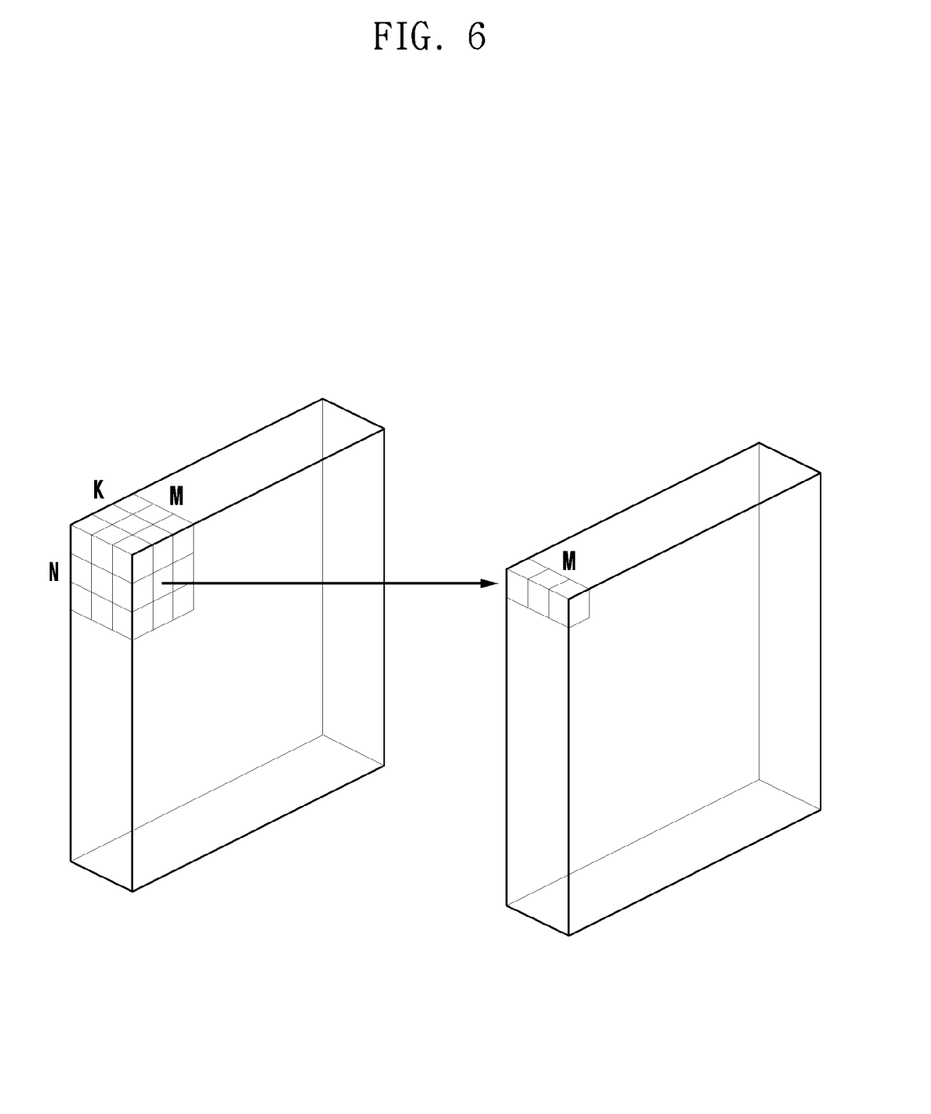
FIG. 6 illustrates a diagram of a depthwise separable (two-dimensional) convolution according to embodiments of this disclosure.

Next, in step 130, a first-resolution image (illustrated in FIG. 5A) is transformed to a second-resolution image (illustrated in FIG. 5B) using said trained intelligent system. Step 130 may further comprise applying two-dimensional filtering in each convolutional CNN layer to each individual feature map extracted from the first-resolution image. The two-dimensional filtering is a mathematical convolution operation between a two-dimensional array of numbers and a rectangular matrix of numbers, called a filter, the number of rows and columns of which is small compared to the height and width of the array. Then, one or more weighted summation operations with the weight sets obtained as a result of CNN training can be applied to the set of feature maps that was obtained as a result of applying the two-dimensional filtering (a CNN training flowchart will be given below with reference to FIG. 2). The number of feature maps processed in each CNN convolutional layer, except for the first one, is equal to the number of filters (also called CNN "kernels") applied in the previous CNN convolutional layer. An illustration of such a depthwise separable (two-dimensional) convolution is shown in FIG. 6. According to embodiments of the present disclosure, instead of the conventional three-dimensional convolution N×K×M, a two-dimensional convolution N×K is used, in which M two-dimensional convolutions, one per map, are first performed for M feature maps. Then weighted summation of the resulting set of M attribute maps is performed by M times. Weighted summation is a less demanding operation than convolution. Due to this approach, the accuracy of CNN's super-resolution operation does not deteriorate, and the number of multiplication operations decreases by M times, resulting in a reduction in the required computation and memory consumption of the mobile device.

Step 130 may further comprise performing weighted summation or another combination of the image obtained by interpolating the first-resolution image and the residual image. The interpolation can be, for example, bilinear interpolation, bicubic interpolation, Lanczos filter interpolation or any other standard interpolation algorithm. Weighted summation or combination makes it possible to eliminate blurring and gradation of the edges of objects in the interpolated image and other defects in the image. The residual image can be generated by the CNN from the first-resolution image, then the generated residual image can be upscaled using an additional back-convolution layer to the dimensions of the interpolated image to enable correct weighted summation or another combination of these images. This approach reduces computational load, since the residual image is generated from the first-resolution image before it is enlarged.

Figure 2:
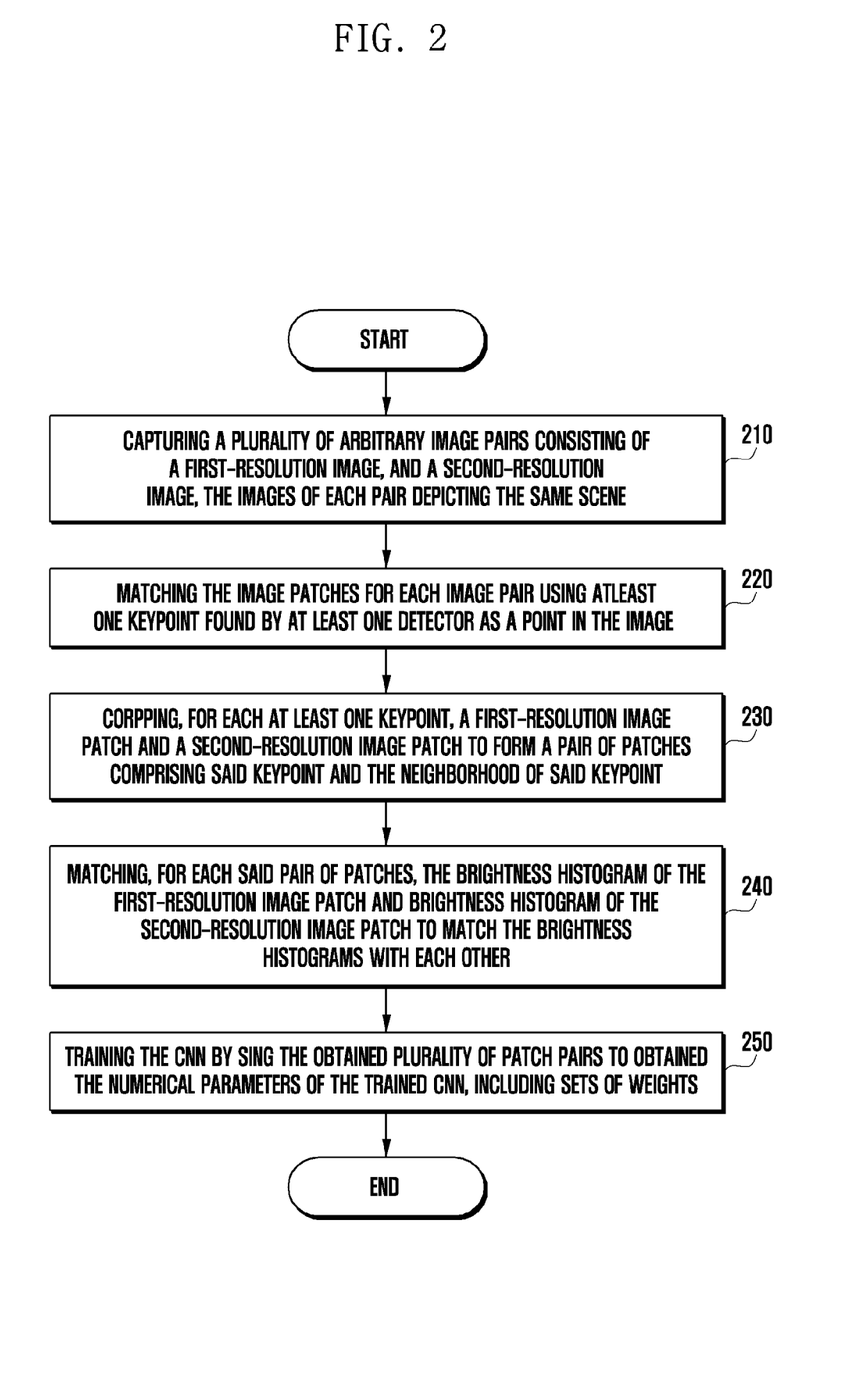
FIG. 2 illustrates a method for training the applicable convolutional neural network (CNN) according to embodiments of this disclosure.

FIG. 2 illustrates a block diagram of training of an intelligent system, such as CNN according to embodiments of this disclosure. In step 210, a plurality of arbitrary image pairs consisting of a first-resolution image and a second-resolution image are captured. The first resolution is lower than the second resolution. The images of each pair of the arbitrary images depict the same scene. The first-resolution image is captured by a camera with 1× zoom factor, i.e. no zooming. The second-resolution image is captured by a camera having optical zoom with the zoom factor being higher than 1, i.e. by camera with optical zoom. The zoom factor for the captured second-resolution image is selected from a predefined set of zoom factors, one-to-one corresponding to the set of super-resolution factors.

For each image pair, matching, in step 220, of the image patches is performed by using at least one keypoint found by at least one detector as a point in the image at which there is a local maximum of the information measure built basing on a human visual system (HVS) model and computed by combining the gradient values of brightness, colors and/or other quantitative characteristics of the images. The at least one detector used at this step may be selected from the group consisting of at least ORB, BRISK, SURF, FAST, Harris, MSER, MinEigen, HOG, LBPF or the like. The present disclosure is not limited to the listed detectors, and includes any number of detectors as commonly used by one of ordinary skill in the art. The human visual system model (HVS) is understood to include other approaches as commonly understood by one of ordinary skill in the art including those described in documents by V. Yanulevskaya, et al., Cognit Comput. 3, 94-104 (2011) and H. Z. Momtaz and M. R. Dalir, Cogn Neurodyn. 10, 31-47 (2016). Quantitative Characteristics of images can be understood as gradients of brightness, colors, saturation, numerical values obtained when said data of a specific image is subjected to multiplication, addition, exponentiation, convolution with a given set of digital filters, as well as statistics computed for each image pixel, such as mathematical expectation, variance, kurtosis coefficient, algebraic and geometric moments and so on.

Next, in step 230, for each at least one keypoint, a first-resolution image patch and a second-resolution image patch are cropped, forming a pair of patches having said keypoint and the neighborhood of said keypoint. A patch is a neighborhood that can have any shape, for example, round, square, etc., of the point at which the local maximum of information measure was found. The patch includes a point, i.e. the "keypoint" itself and the surroundings around it.

Figure 4:
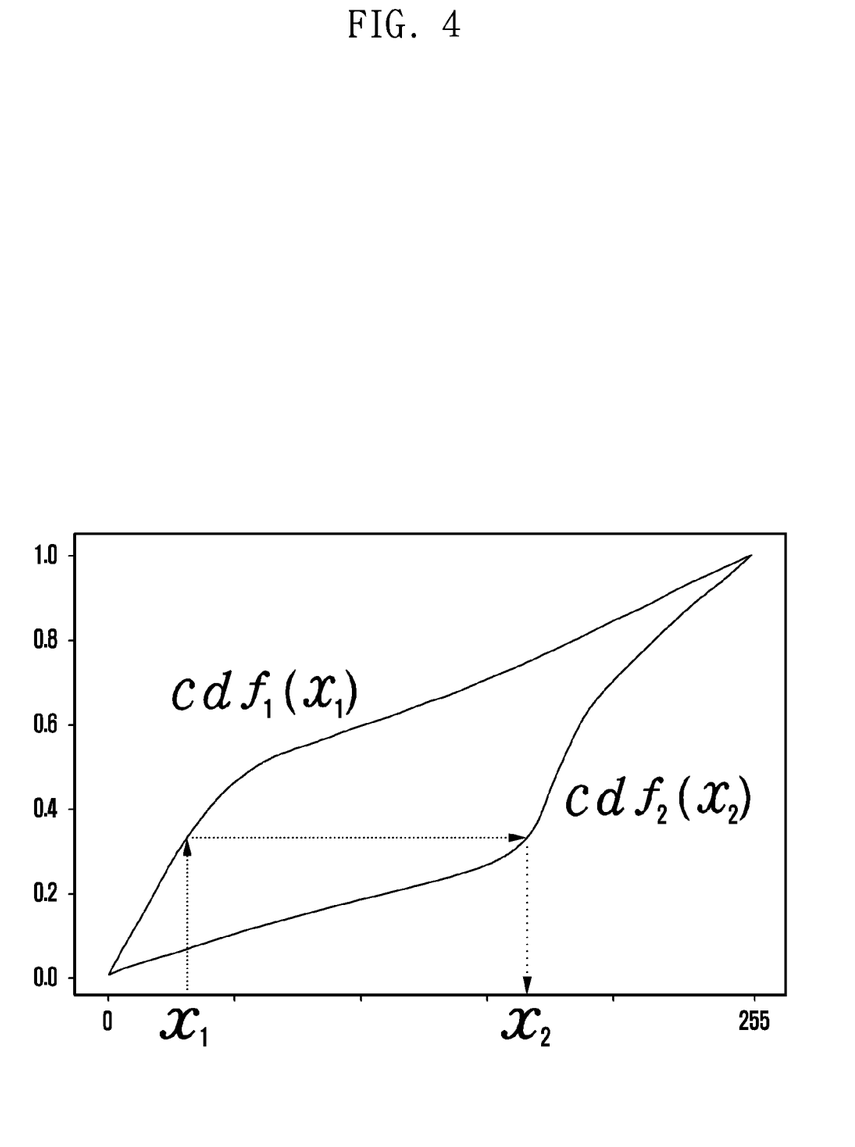
FIG. 4 illustrates an example of histogram matching of two image patches, which is applied in step (240) of FIG. 2 according to embodiments of this disclosure.
Figure 5A:
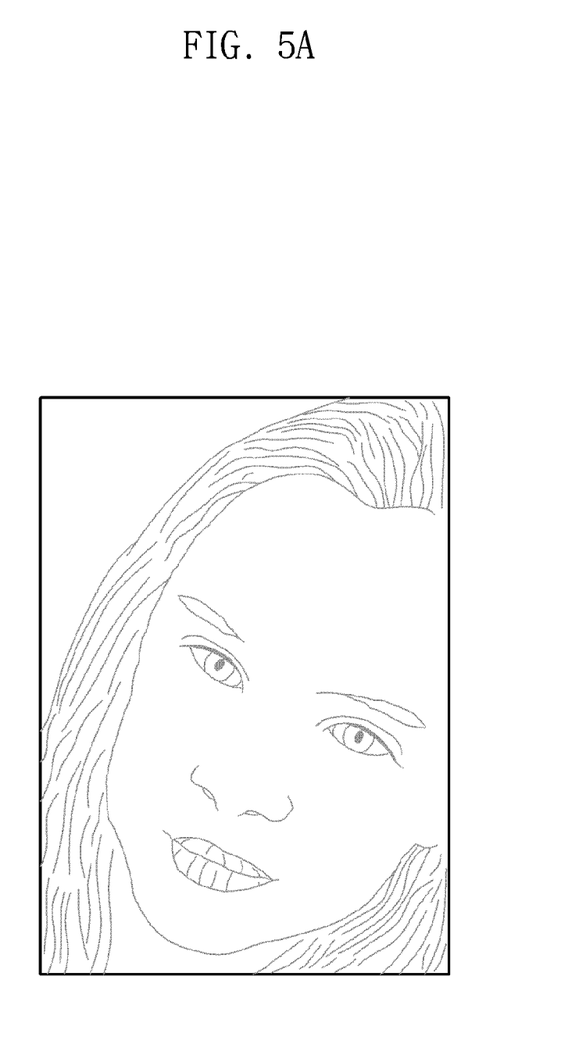
Figure 5B:
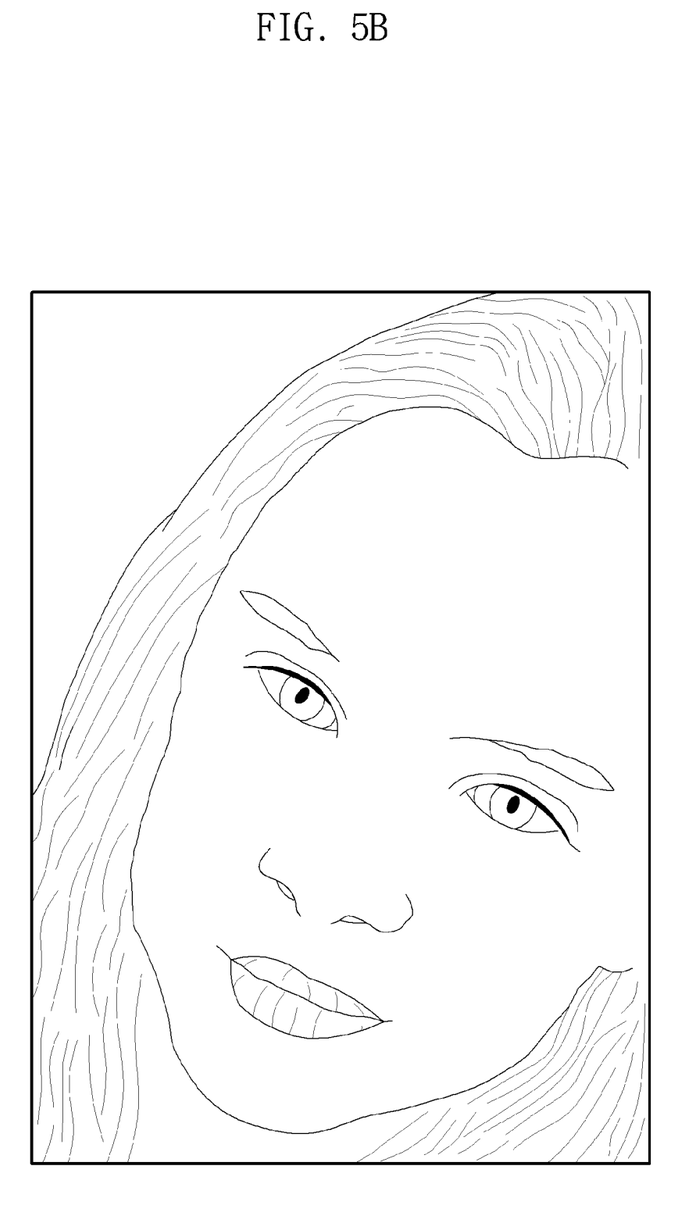
FIG. 5B shows the resulting second-resolution image according to embodiments of this disclosure.

Then, in step 240, for each said pair of patches, matching is performed for brightness histogram of the first-resolution image patch and brightness histogram of the second-resolution image patch to match the brightness histograms with each other. FIG. 4 illustrates an example of histogram matching. The matching of histograms involves computation of cumulative distribution (cdf) functions for patches of two images and finding, for each gray level x1, such a gray level x2 for which cdf(x1)=cdf(x2). This mapping is the result of histogram matching. Moreover, this mapping is performed in relation to a part of continuous (solid) data. Such continuity data-oriented and patch-based approach assumes that part of the continuous data is taken for histogram matching, while the rest is out from consideration. This approach is computationally fast and simple way to resolve a complex problem. The result is better imaging due to recovery of tiny details and preventing from artifacts and overblurring of the image.

In step 250, the CNN is trained using the obtained plurality of patch pairs to obtain the numerical parameters of the trained CNN, including sets of weights, wherein each patch pair consists of a first-resolution patch and a corresponding second-resolution patch with the matched histograms. The above learning steps (210, 220, 230, 240, 250) are performed for each zoom factor of said set of zoom factors to obtain said plurality of the trained intelligent systems, each having its own corresponding zoom factor. The set of zoom factors one-to-one corresponds to the set of super resolution factors, i.e. one particular super resolution factor corresponds to a particular zoom factor. Training of auto-encoder and non-linear regression can be carried out in a similar way on pairs of image patches of different resolution.

The camera with 1× zoom factor and the camera having optical zoom with the zoom factor being higher than 1 used according to embodiments of the present disclosure to obtain training images, are timed and centered along the optical axis via an optical divider. The configuration of such a training image capturing system can be any suitable configuration in which timing and centering along the optical axis of the captured images are achieved.

The CNN training may additionally contain optimization of the number of layers and the number of CNN parameters, where the number of layers and the number of CNN parameters are determined using the greedy algorithm known in the art to minimize the used layers and CNN parameters while maximizing the super resolution by numerical characteristics including, but not limited to, for example, standard deviation and structural similarity. This optimization is performed iteratively, first selecting the maximum permissible limits of the future CNN, then training the CNN to achieve the maximum desired level of super resolution, evaluating this resolution either by subjective estimates or by objective quantitative quality criteria such as, but not limited to, for example, peak signal-to-noise ratio, structure/features similarity, Wasserstein distance. Then, at the next iteration, the number of layers and the number of parameters are reduced simultaneously with CNN retraining, and the super resolution quality of the retrained CNN is re-evaluated. The number of such iterations is not limited and they are performed until the problem of minimizing the layers and CNN parameters used in maximizing the super resolution in terms of numerical characteristics is resolved.

Figure 3:
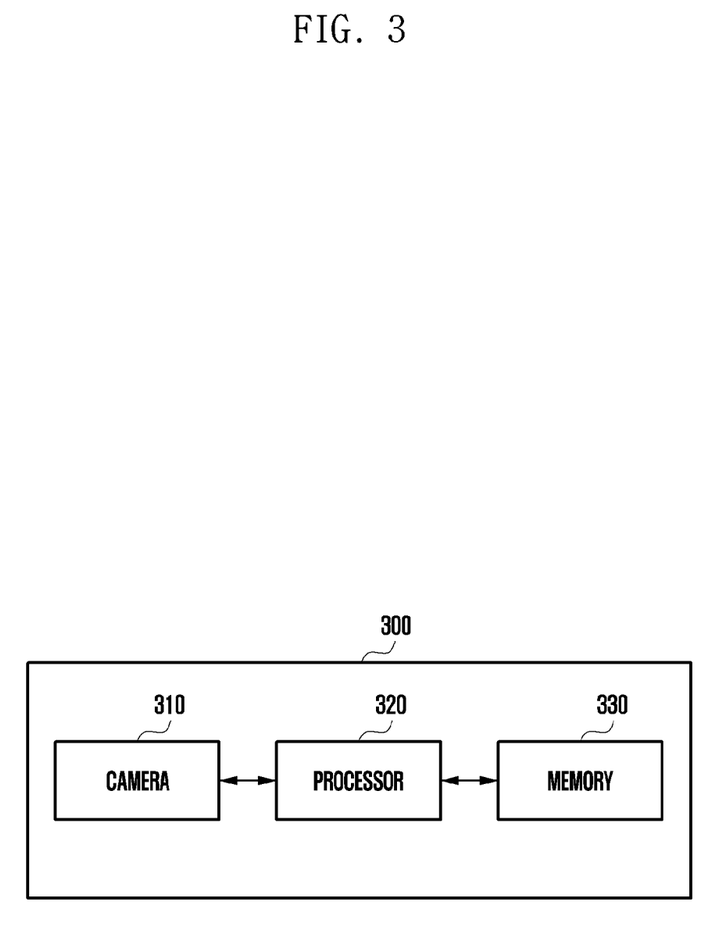
FIG. 3 illustrates a diagram of a mobile device according to embodiments of this disclosure.

FIG. 3 illustrates a block diagram of a mobile device 300, which according to an embodiment may be a resource-constrained mobile computing device. The mobile device 300 on which the method described above can be implemented may include, but not limited to, a processor 320, a camera 310 and a memory 330 that stores the numerical parameters of a plurality of trained intelligent systems and instructions read and executed by the processor that, when executed by the processor 320, cause the processor to implement any step(s) of image super resolution of the method according to embodiments of this disclosure. The components in the device 300 can be connected to each other and to other optional components of the device in any suitable way, which will be obvious to those skilled in the art for implementing the method on such a device. The mobile device 300 may comprise other components not shown in FIG. 3 and can be, for example, a smart-phone, tablet, virtual reality glasses, augmented reality glasses, laptop, smart watches, etc. as well as some specialized equipment, for example, a mobile system (home, office) video surveillance, car DVR, unmanned aerial vehicle (drone), etc. According to an embodiment of the mobile device, said device may comprise separate hardware units. Each hardware unit may be responsible for execution of the corresponding step or substep of the super resolution method and be named accordingly, for example, the device hardware unit responsible for transforming (as in step 130 of FIG. 1) the input first-resolution image to the second-resolution image may be referred to as a transformer, etc. However, the embodiment should not be limited only to such a unit structure, as one skilled in the art will appreciate other possible structures in the device, in which, as an example, one hardware unit may be responsible for performing several steps or substeps of the disclosed method, or several steps or substeps of the disclosed method may be divided between two or more units.

In addition, the method disclosed may be implemented by a processor, a special purpose integrated circuit (ASIC), a user programmable gate array (FPGA), or as a system on a chip (SoC). In addition, the method disclosed can be implemented by a computer-readable medium that stores the numerical parameters of a plurality of trained intelligent systems and computer-executable instructions that, when executed by a computer processor, cause the computer to carry out the disclosed method for image super resolution. The trained intelligent system instructions for implementing the method can be downloaded into a mobile device via a network or from a medium.

Reference numerals used in this disclosure should not be interpreted as unambiguously determining the sequence of steps, since after reading the above disclosure, other modified sequences of the above steps will become apparent to those skilled in the art. The reference numerals were used in this description and are used in the following claims only as a through indicator the corresponding element of the application, which facilitates its perception and ensures observing of the unity of terminology.

Although the present disclosure has been described with various embodiments, various changes and modifications may be suggested to one skilled in the art. It is intended that the present disclosure encompass such changes and modifications as fall within the scope of the appended claims.

What is claimed is:

1. An operating method of a mobile device, the method comprising:
   obtaining a first-resolution image;
   assigning a super resolution factor from a predefined set of super resolution factors that indicate increasing a first resolution to obtain a second-resolution image, wherein the super resolution factor indicates an intelligent system imitating an operation of a corresponding optical system among a plurality of intelligent systems trained for each super resolution factor of the predefined set of super resolution factors; and
   transforming the first-resolution image into the second-resolution image using the intelligent system, wherein at least one of the plurality of intelligent systems is a convolutional neural network (CNN), the CNN comprising:
      capturing a plurality of image pairs consisting of a first-resolution image and a second-resolution image, each image of the image pairs depicting a same scene, wherein the first-resolution image is captured by a camera with 1× zoom factor, and the second-resolution image is captured by a camera having optical zoom with a zoom factor being higher than 1, the zoom factor for the second-resolution image being selected from a predefined set of zoom factors corresponding to the predefined set of super resolution factors;
      matching image patches for each image pair using at least one keypoint found by at least one detector as a point in an image at which there is a local maximum of information measure built based on a human visual system (HVS) model and computed by combining gradient values of brightness, colors, or other quantitative characteristics of the image;
      cropping, for the at least one keypoint, a first-resolution image patch and a second-resolution image patch to form a pair of patches comprising the at least one keypoint and a neighborhood of the at least one keypoint;
      matching, for each pair of patches, a brightness histogram of the first-resolution image patch and a brightness histogram of the second-resolution image patch; and
      training iteratively the CNN by using the pair of patches to obtain numerical parameters of the trained CNN, including sets of weights, wherein each pair of patches comprises a first-resolution patch and a corresponding second-resolution patch with the matched brightness histograms.

2. The method of claim 1, wherein obtaining the first-resolution image further comprises one of:
   inputting the first-resolution image captured by a camera of the mobile device,
   loading the first-resolution image from a memory of the mobile device or an external data source, or
   selecting an arbitrary image area as the first-resolution image,
   wherein the first-resolution image is a still image or a video data frame.

3. The method of claim 1, wherein the camera with 1× zoom factor and the camera having optical zoom with the zoom factor being higher than 1 are timed and centered along an optical axis via an optical divider.

4. The method of claim 1, wherein transforming the first-resolution image into the second-resolution image further comprises:
   applying two-dimensional filtering in each convolutional CNN layer to each individual feature map extracted from the first-resolution image, and
   applying one or more weighted summation operations with weight sets obtained as a result of CNN training to a set of feature maps,
   wherein a number of feature maps processed in each CNN convolutional layer, except for a first one, is equal to a number of filters applied in a previous CNN convolutional layer.

5. The method of claim 1, wherein the at least one detector used in matching the image patches is selected from a group comprising at least ORB, BRISK, SURF, FAST, Harris, MSER, MinEigen, HOG, or LBPF.

6. The method of claim 1, wherein transforming the first-resolution image into the second-resolution image further comprises:
   performing weighted summation of an image obtained by interpolating the first-resolution image and a residual image generated by the trained CNN,
   wherein the interpolation is one of bilinear interpolation, bicubic interpolation or Lanczos filter interpolation.

7. The method of claim 1, wherein a number of layers and a number of CNN parameters are determined by using a greedy algorithm to minimize used layers and CNN parameters while maximizing a super resolution by numerical characteristics including standard deviation, or structural similarity.

8. The method of claim 1, wherein the trained CNN is one of:
   an auto-encoder comprising a coupled encoder and decoder, the auto-encoder being configured to generalize and correlate input data so that the decoder transforms the first-resolution image to the second-resolution image, or
   non-linear regression configured to approximate a function of transforming the first-resolution image into the second-resolution image as a non-linear combination of model parameters.

9. A mobile device, comprising:
   a processor;
   a camera configured to capture an image;
   a memory configured to store numerical parameters of a plurality of intelligent systems and instructions that, when executed by the processor, cause the processor to:
   obtain a first-resolution image;
   assign a super resolution factor from a predefined set of super resolution factors that indicate increasing a first resolution to obtain a second-resolution image, wherein the super resolution factor indicates an intelligent system imitating an operation of a corresponding optical system among a plurality of intelligent systems trained for each super resolution factor of the predefined set of super resolution factors; and
   transform the first-resolution image into the second-resolution image using the intelligent system, wherein at least one of the plurality of intelligent systems is a convolutional neural network (CNN), the CNN comprising:
      capturing a plurality of image pairs consisting of a first-resolution image and a second-resolution image, each image of the image pairs depicting a same scene, wherein the first-resolution image is captured by a camera with 1× zoom factor, and the second-resolution image is captured by a camera having optical zoom with a zoom factor being higher than 1, the zoom factor for the second-resolution image being selected from a predefined set of zoom factors corresponding to the predefined set of super resolution factors;

matching image patches for each image pair using at least one keypoint found by at least one detector as a point in an image at which there is a local maximum of information measure built based on a human visual system (HVS) model and computed by combining gradient values of brightness, colors, or other quantitative characteristics of the image;

cropping, for the at least one keypoint, a first-resolution image patch and a second-resolution image patch to form a pair of patches comprising the at least one keypoint and a neighborhood of the at least one keypoint;

matching, for each pair of patches, a brightness histogram of the first-resolution image patch and a brightness histogram of the second-resolution image patch; and training iteratively the CNN by using the pair of patches to obtain numerical parameters of the trained CNN, including sets of weights, wherein each pair of patches comprises a first-resolution patch and a corresponding second-resolution patch with the matched brightness histograms.

10. The mobile device of claim 9, wherein the instructions, when executed, cause the processor to obtain the first-resolution image by:

inputting the first-resolution image captured by a camera of the mobile device, loading the first-resolution image from a memory of the mobile device or an external data source, or selecting an arbitrary image area as the first-resolution image, wherein the first-resolution image is a still image or a video data frame.

11. The mobile device of claim 9, wherein the camera with 1× zoom factor and the camera having optical zoom with the zoom factor being higher than 1 are timed and centered along an optical axis via an optical divider.

12. The mobile device of claim 9, wherein to transform the first-resolution image into the second-resolution image, the instructions further cause the processor to:

apply two-dimensional filtering in each convolutional CNN layer to each individual feature map extracted from the first-resolution image, and apply one or more weighted summation operations with weight sets obtained as a result of CNN training to a set of feature maps, wherein a number of feature maps processed in each CNN convolutional layer, except for a first one, is equal to a number of filters applied in a previous CNN convolutional layer.

13. The mobile device of claim 9, wherein the at least one detector used to match the image patches is selected from a group comprising of at least ORB, BRISK, SURF, FAST, Harris, MSER, MinEigen, HOG, or LBPF.

14. The mobile device of claim 9, wherein to transform the first-resolution image into the second-resolution image, the instructions further cause the processor to:

perform weighted summation of an image obtained by interpolating the first-resolution image and a residual image generated by the trained CNN, wherein the interpolation is one of bilinear interpolation, bicubic interpolation, or Lanczos filter interpolation.

15. The mobile device of claim 9, wherein the instructions cause the processor to determine a number of layers and a number of CNN parameters by using a greedy algorithm to minimize used layers and CNN parameters while maximizing a super resolution by numerical characteristics including standard deviation, or structural similarity.

16. The mobile device of claim 9, wherein the trained CNN is one of:

an auto-encoder comprising a coupled encoder and decoder, the auto-encoder being configured to generalize and correlate input data so that the decoder transforms the first-resolution image to the second-resolution image, or non-linear regression configured to approximate a function of transforming the first-resolution image into the second-resolution image as a non-linear combination of model parameters.

* * * * *